United States Patent
Kang

(10) Patent No.: US 11,604,734 B2
(45) Date of Patent: Mar. 14, 2023

(54) MEMORY SYSTEM FOR DETERMINING WHETHER TO CONTROL A POINT OF EXECUTION TIME OF A COMMAND BASED ON VALID PAGE COUNTS OF TARGET MEMORY BLOCKS AND OPERATING METHOD THEREOF

(71) Applicant: SK hynix Inc., Icheon-si (KR)

(72) Inventor: Min Gu Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 72 days.

(21) Appl. No.: 17/302,234

(22) Filed: Apr. 27, 2021

(65) Prior Publication Data
US 2022/0179796 A1 Jun. 9, 2022

(30) Foreign Application Priority Data
Dec. 4, 2020 (KR) .................. 10-2020-0168863

(51) Int. Cl.
G06F 12/08 (2016.01)
G06F 12/0888 (2016.01)
G06F 12/02 (2006.01)

(52) U.S. Cl.
CPC ...... *G06F 12/0888* (2013.01); *G06F 12/0253* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 2014/0032817 A1* | 1/2014 | Bux ................... | G06F 12/0261 711/E12.008 |
| 2014/0281127 A1* | 9/2014 | Marcu ................ | G06F 12/0238 711/103 |
| 2014/0310494 A1* | 10/2014 | Higgins ............. | G06F 12/0246 711/167 |
| 2017/0010815 A1* | 1/2017 | Sprouse .............. | G06F 3/0688 |
| 2017/0285945 A1* | 10/2017 | Kryvaltsevich ...... | G06F 3/0679 |

FOREIGN PATENT DOCUMENTS

| | | |
|---|---|---|
| KR | 10-2076248 | 2/2020 |
| KR | 10-2020-0027858 | 3/2020 |

* cited by examiner

*Primary Examiner* — Tracy C Chan
(74) *Attorney, Agent, or Firm* — Weaver Austin Villeneuve & Sampson LLP

(57) ABSTRACT

Embodiments of the disclosure relate to a memory system and an operating method thereof. The memory system is configured to select, among the plurality of memory blocks, one or more target memory blocks operable to store user data to be accessed by a host which requests the memory system to write data, and determine whether to control a point of execution time of a command received from the host, based on valid page counts of respective target memory blocks.

12 Claims, 14 Drawing Sheets

*FIG.9*

| R | T1 (us) |
|---|---|
| R < R1 | 400 |
| R1 ≤ R < R2 | 300 |
| R2 ≤ R < R3 | 200 |
| R ≥ R3 | 100 |

FIG.11

| R | T2 (us) |
|---|---|
| $R < R1'$ | 400 |
| $R1' \leq R < R2'$ | 300 |
| $R2' \leq R < R3'$ | 200 |
| $R \geq R3'$ | 100 |

MEMORY SYSTEM FOR DETERMINING WHETHER TO CONTROL A POINT OF EXECUTION TIME OF A COMMAND BASED ON VALID PAGE COUNTS OF TARGET MEMORY BLOCKS AND OPERATING METHOD THEREOF

CROSS-REFERENCE TO RELATED APPLICATION

The present application claims priority under 35 U.S.C. § 119(a) to Korean Patent Application No. 10-2020-0168863, filed in the Korean Intellectual Property Office on Dec. 4, 2020, which is incorporated herein by reference in its entirety.

BACKGROUND

1. Technical Field

Embodiments of the present invention generally relate to a memory system and an operating method thereof.

2. Related Art

A memory system includes a data storage device or a memory device that stores data in response to a request from a host, such as a computer, servers, a smartphone, a tablet PC, or other electronic devices. Examples of the memory system may span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

As major indexes for determining the performance of a memory system, throughput and quality of service (QoS) are used. Throughput indicates a data processing amount per unit time, and QoS indicates how constantly latency, as a time required to process a command received from a host, is maintained.

SUMMARY

Embodiments of the present disclosure are directed to a memory system and an operating method that are capable of maintaining QoS at a predetermined level or higher and at the same time maximizing throughput of processing commands received from a host.

In one aspect, embodiments of the disclosure may provide a memory system which includes a memory device having a plurality of memory blocks; and a memory controller configured to communicate with the memory device and control the memory device.

The memory controller may select, among the plurality of memory blocks, one or more target memory blocks capable of storing user data to be accessed by a host which requests the memory system to write data.

The memory controller may determine whether to control a point of execution time of a command received from the host, based on valid page counts of respective target memory blocks.

In one embodiment, the memory controller may calculate a percentage of valid pages of each target memory block, based on a valid page count of each target memory block, and may determine to control a point of execution time of a command received from the host, when a value of R is less than a preset threshold percentage, where R is a percentage value of the target memory blocks each having a percentage of valid pages equal to or greater than a reference percentage, among a total number of target memory blocks.

The memory controller may process a fetch operation on the command, within a first time interval, so as to control a point of execution time of a command received from the host. The memory controller may determine the first time interval based on the value of R.

The memory controller may process an operation of transmitting a processing completion message on the command to the host, within a second time interval, so as to control a point of execution time of a command received from the host. The memory controller may determine the second time interval based on the value of R.

In another aspect, embodiments of the present disclosure may provide a method for operating a memory system including a memory device having a plurality of memory blocks.

The method for operating a memory system may include selecting, among the plurality of memory blocks, one or more target memory blocks capable of storing user data to be accessed by a host which requests the memory system to write data.

The method for operating a memory system may include determining whether to control a point of execution time of a command received from a host, based on valid page counts of respective target memory blocks.

In one embodiment, determining whether to control the point of execution time of the command received from the host may include calculating a percentage of valid pages of each target memory block, based on a valid page count of each target memory block; and determining to control the point of execution time of the command received from the host, when a value of R is less than a preset threshold percentage, where R is a percentage of the target memory blocks each having a percentage of valid pages equal to or greater than a reference percentage, among a total number of target memory blocks.

The method for operating a memory system may further include processing a fetch operation on the command, with at least a first preset time interval, so as to control a point of execution time of a command received from the host. The first time interval may be determined based on the value of R.

The method for operating a memory system may further include processing an operation of transmitting a processing completion message on the command to the host, within a second time interval, so as to control a point of execution time of a command received from the host. The second time interval may be determined based on the value of R.

Some embodiments of the disclosure, by managing QoS only at a point of time at which degradation of QoS is expected, provide advantages of maintaining QoS at a predetermined level or higher and at the same time maximizing throughput of processing commands received from a host.

BRIEF DESCRIPTION OF THE DRAWINGS

FIG. 9 is a diagram illustrating an exemplary operation of determining a first time interval in FIG. 8.

FIG. 11 is a diagram illustrating an exemplary operation of determining a second time interval in FIG. 10.

DETAILED DESCRIPTION

Hereinafter, embodiments of the present disclosure are described in detail with reference to the accompanying drawings. Throughout the specification, reference to "an embodiment," "another embodiment" or the like does not necessarily refer to only one embodiment, and different references to any such phrase do not necessarily refer to the same embodiment(s). The term "embodiments" when used herein does not necessarily refer to all embodiments.

Figure 1:
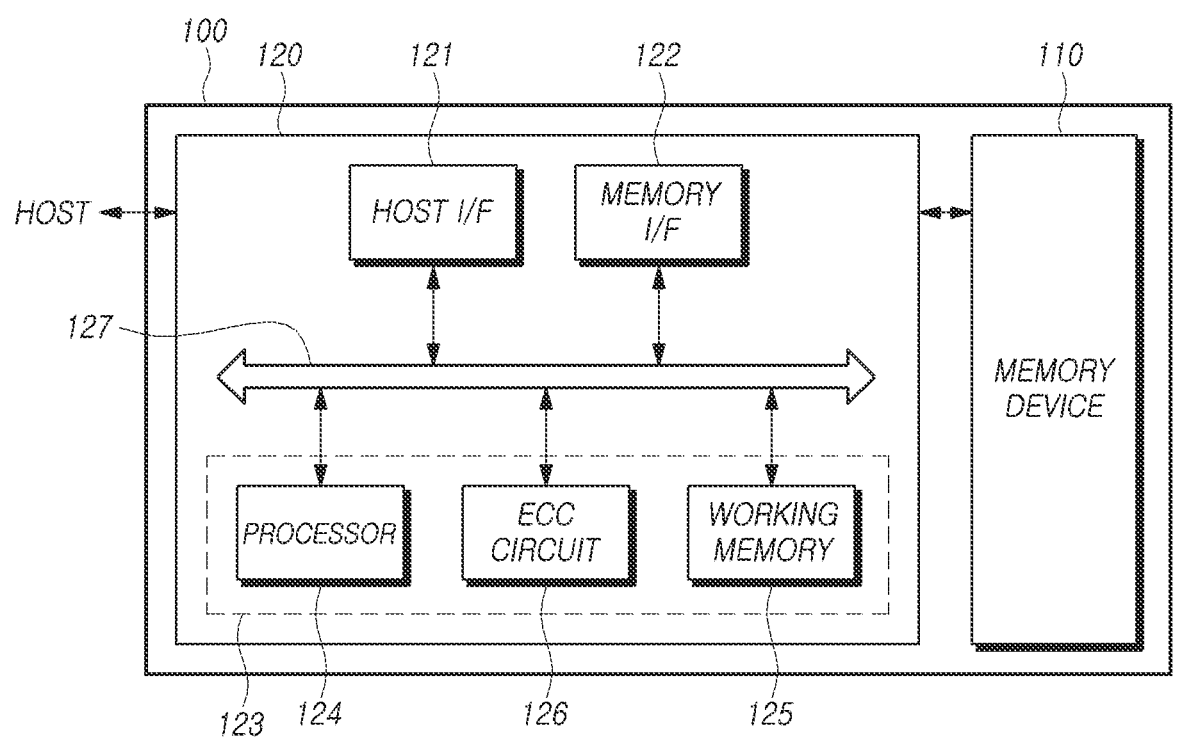
FIG. 1 is a schematic diagram illustrating a configuration of a memory system according to an embodiment of the disclosed technology.

FIG. 1 is a schematic diagram illustrating a configuration of a memory system 100 according to an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, such an electric charge storage layer can be referred to as a floating gate. In another implementation, the electric charge storage layer may be formed of an insulating material, and such a flash memory device can be referred to as a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During a program operation, the memory device 110 may write data in the area selected by the address. During a read operation, the memory device 110 may read data from a memory area selected by the address. During an erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection operation (GC), a wear leveling (WL) operation, and a bad block management (BBM) operation.

The memory controller 120 may control the operations of the memory device 110 at the request of a host. Alternatively, the memory controller 120 may control the operations of the memory device 110 even in the absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as a not limiting example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation in response to the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations in the memory device 110 based on control signals and instructions from the control circuit 123.

The control circuit 123 may be configured to control the operations of the memory device 110 through the memory controller 120. For example, the control circuit 123 may include a processor 124 and a working memory 125. The control circuit 123 may further include an error detection/correction circuit (ECC circuit) 126 and the like configured to detect and/or correct one or more errors.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be configured to perform operations associated with a flash translation layer (FTL) to effectively manage the memory operations in the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on a mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The term "firmware" may refer to a program or software stored in a certain nonvolatile memory that is executed by the processor 124 inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one of a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those elements illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
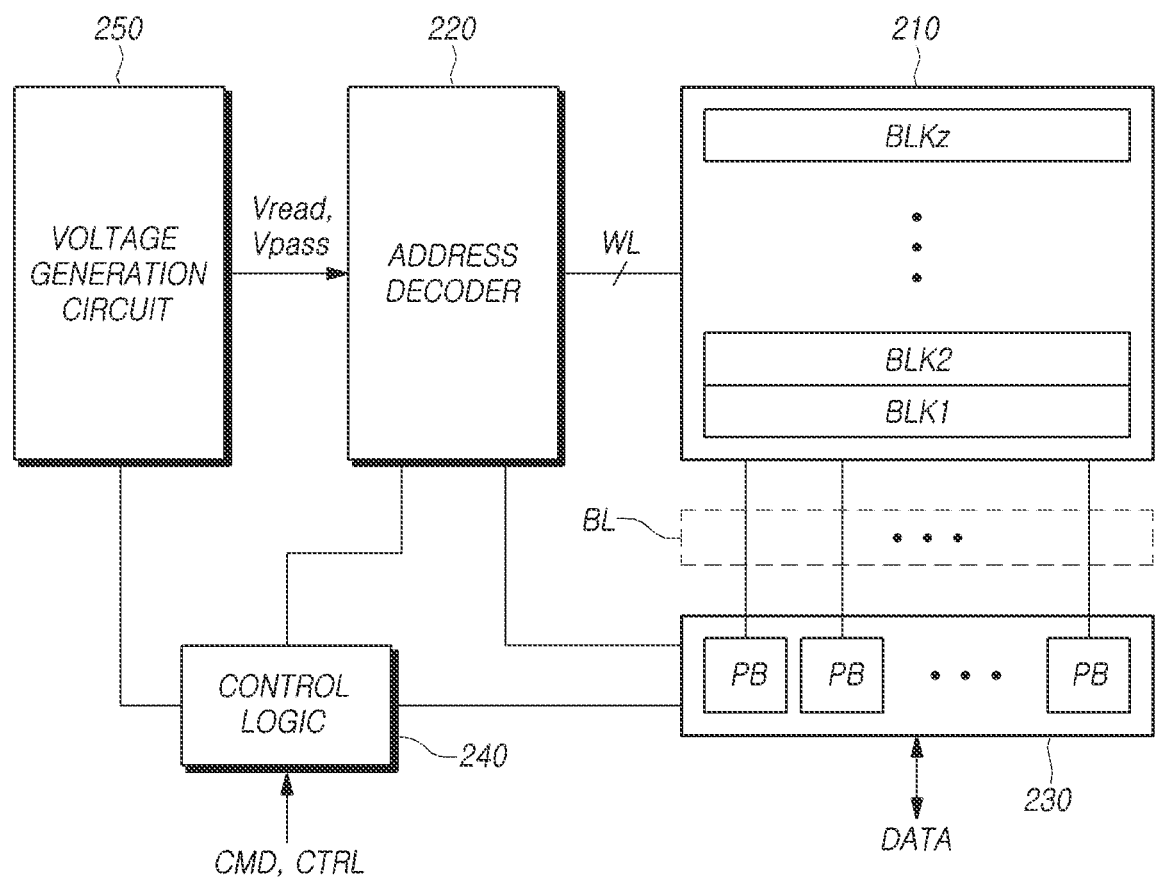
FIG. 2 is a block diagram schematically illustrating a memory device according to an embodiment of the disclosed technology.

FIG. 2 is a block diagram schematically illustrating a memory device 110 according to an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As yet another example, each of the multiple memory cells included in the memory cell array 210 may be a quad-level cell (QLC) configured to store four bits of data per memory cell. As still another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK disposed in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. Alternatively, each of the multiple word lines WL may be arranged in the column direction, and each of the multiple bit lines BL may be arranged in the row direction.

In some implementations, the multiple word lines WL and the multiple bit lines BL may intersect with each other and electrically isolated from each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
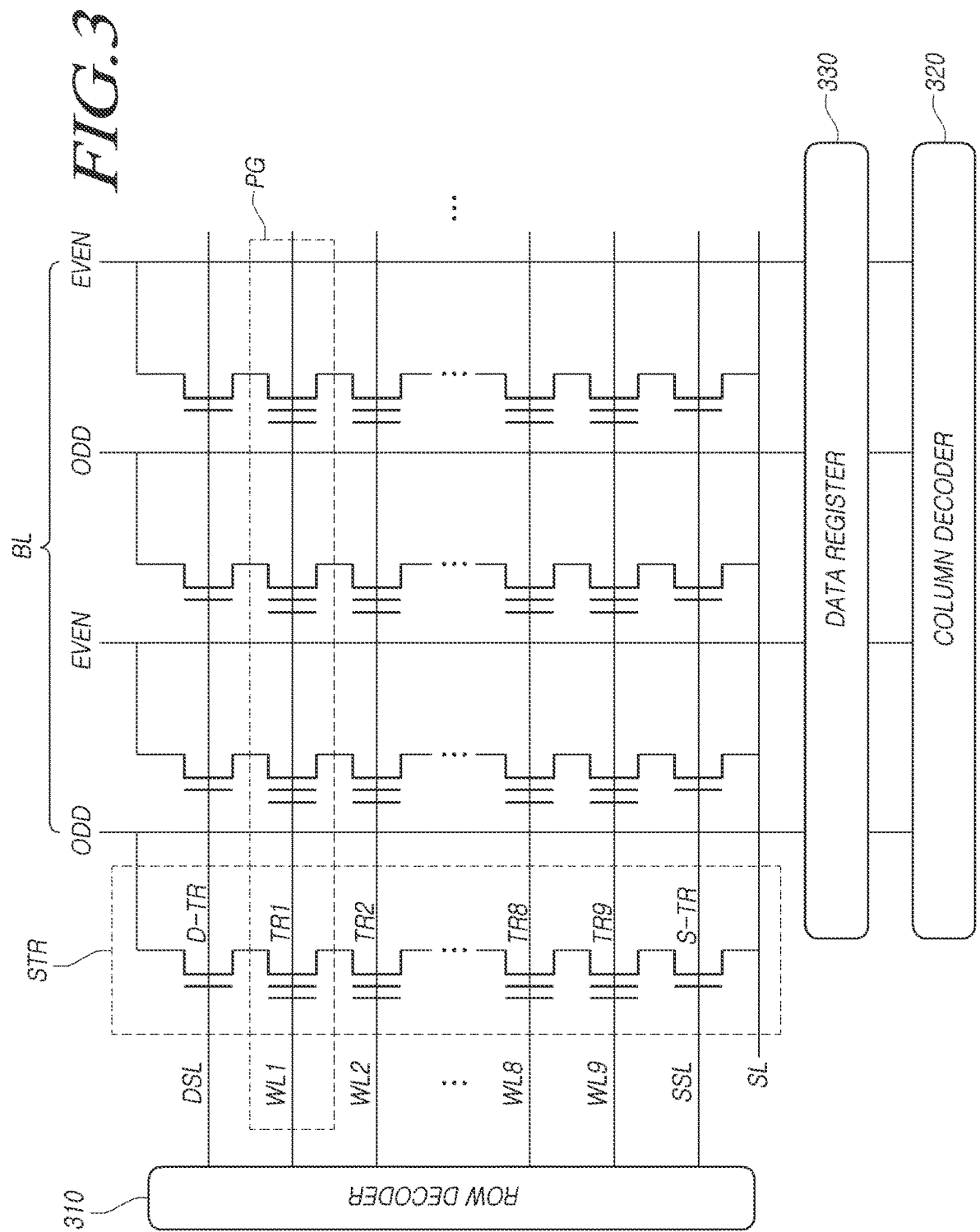
FIG. 3 is a diagram illustrating a structure of word lines and bit lines of a memory device according to an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
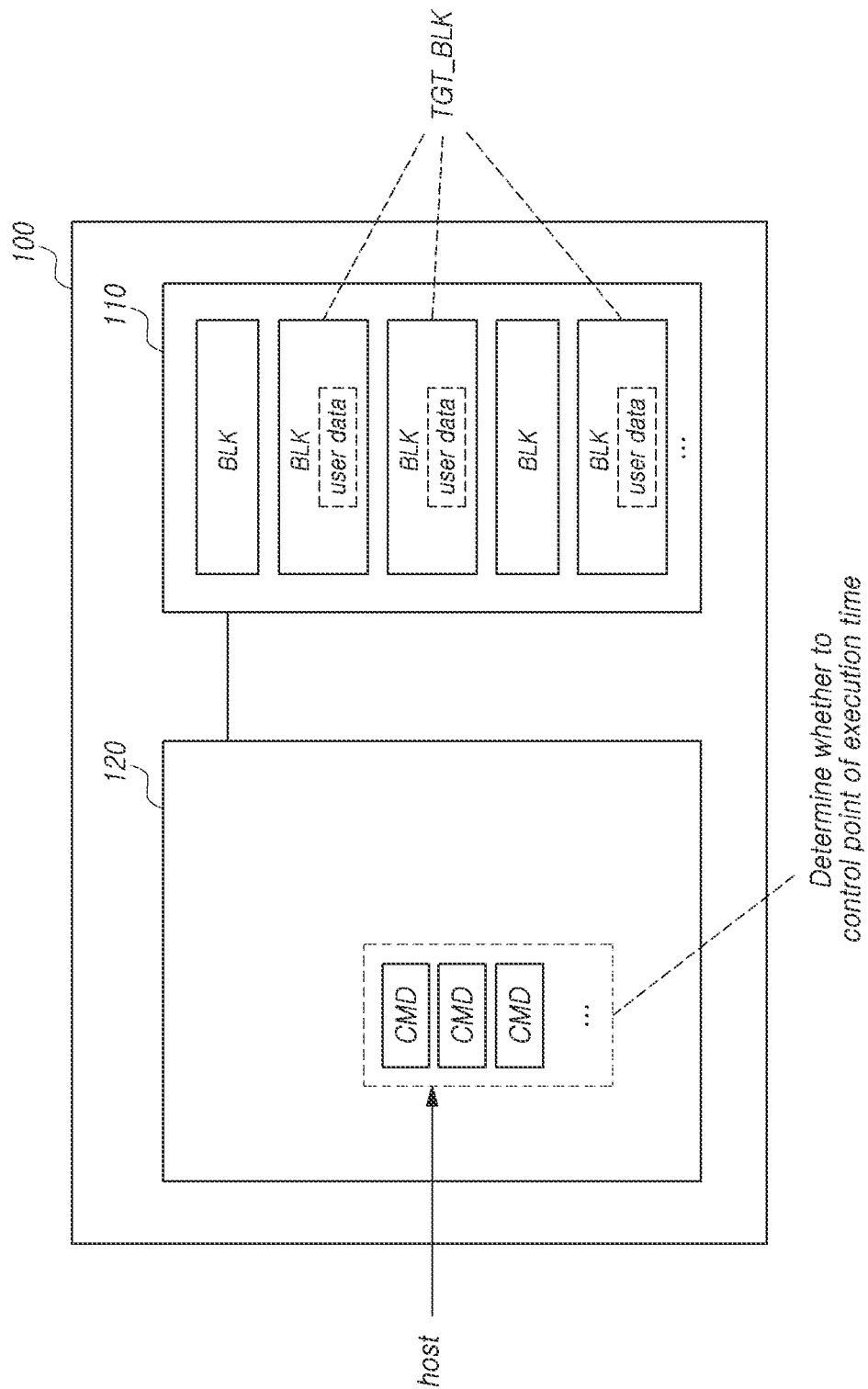
FIG. 4 is a schematic diagram illustrating an operation of a memory system according to exemplary embodiments of the disclosure.

FIG. 4 is a schematic diagram illustrating an exemplary operation of a memory system 100 according to embodiments of the disclosure.

Referring to FIG. 4, the memory system 100 includes a memory device 110 and a memory controller 120 coupled to the memory device 110 and configured to receive commands CMD from a host. The memory device 110 may include a plurality of memory blocks BLK and one or more target memory blocks TGT_BLK. The memory controller 120 may select at least one target memory block TGT_BLK among the plurality of memory blocks BLK included in the memory device 110. A target memory block TGT_BLK is referred to as a memory block that may store user data. User data may be accessed by the host which requests the memory system 100 to write data to at least one target memory block TGT_BLK.

A target memory block TGT_BLK may be, for example, a memory block which is selected as a target for garbage collection (garbage collection target memory block) among the plurality of memory blocks BLK.

The memory controller 120 may determine whether to control a point of execution time of a command CMD received from the host, according to a specific criterion.

In one embodiment, in the case where a garbage collection operation is being performed, the memory controller 120 may determine to control a point of execution time of a command CMD received from the host. At this time, the memory controller 120 may differently adjust a point of execution time of a command CMD, based on the size of an available resource (e.g., a difference between the size of an entire buffer and the size of a buffer in use).

In another embodiment, the memory controller 120 may determine whether to control a point of execution time of a command CMD received from the host, based on a valid page count of each of the target memory blocks TGT_BLK.

A valid page count of a memory block is defined as the number of pages in which valid data accessible by the host are stored, among a plurality of pages included in the corresponding memory block. The memory controller 120 may calculate a valid page count of the target memory block TGT_BLK from a point of time at which an operation of rebuilding an LBA lookup table is completed when the memory system 100 is booting up. The memory controller 120 may update a valid page count of the target memory block TGT_BLK when data stored in the target memory block TGT_BLK is updated while processing a command CMD received from the host or performing a background operation (e.g., garbage collection).

The fact that the memory controller 120 controls a point of execution time of a command CMD received from the host means that the memory controller 120 adjusts a point of time at which the command CMD is executed, to be early or late. On the other hand, in the case where the memory controller 120 does not control a point of execution time of a command CMD received from the host, the memory controller 120 may execute the received command CMD at an earliest point of executable time.

It will be appreciated that, instead of expressing that the memory controller 120 controls a point of execution time of a command CMD, a phrase, such as the memory controller 120 performs flow control on a command CMD, may alternatively be used.

The reason for the memory controller 120 to determine whether to control a point of execution time of a command CMD is that throughput and QoS as major indexes for determining the performance of the memory system 100 generally have an inversely proportional correlation.

That is to say, in the case where the memory controller 120 tries to process a command CMD as quickly as possible so as to increase throughput, a time period during which the command CMD cannot be processed may occur due to the use of a resource to process a garbage collection operation and other background operations (e.g., storage of an LBA lookup table, storage and search of SMART information and management of metadata), thereby degrading QoS.

On the other hand, in the case where the memory controller 120 tries to increase QoS to a predetermined level or higher, throughput may be reduced since there is a possibility that processing of a command CMD may be delayed in the process of adjusting a point of time for processing the command CMD which is able to be quickly processed.

In the case where the memory controller 120 does not control a point of execution time of a command CMD, the memory controller 120 may execute the command CMD at an earliest point of executable time so as to maximize throughput. In this regard, in the case where a resource to be used for the memory controller 120 to process a command CMD is sufficient, latency required to process the command CMD received from the host is short, and thus, QoS may be maintained at a predetermined level or higher even though the memory controller 120 does not control an execution speed of the command CMD. Such a situation occurs in the case where a background operation such as garbage collection is not performed or a resource to be used to perform the background operation is much smaller than a resource to be used to process the command CMD received from the host.

However, in a situation in which a background operation is actively performed, a resource to be used for the memory controller 120 to process a command CMD may not be sufficient. In this case, latency required to process a command CMD received from the host increases. Since a background operation is irregularly performed regardless of a command CMD received from the host, latencies for all commands CMD may not increase uniformly, and only latency for a specific command CMD may abruptly increase. As a result, a deviation in latency of each command CMD may increase. Therefore, QoS may be degraded below the predetermined level.

Accordingly, the memory controller 120 may be specifically programmed to control a point of execution time of a command CMD so as to reduce a deviation in latency of each command CMD, thereby controlling latencies associated with processing commands CMD as constant as possible. Through this, the memory controller 120 may maintain QoS at the predetermined level or higher. However, throughput may be reduced while the memory controller 120 is specifically programmed to control a point of execution time of a command CMD.

Therefore, the memory controller 120 may control a point of execution time of a command CMD only in a specific situation to maintain QoS at the predetermined level or higher, thereby maintaining QoS at the predetermined level or higher and at the same time, maximizing throughput.

Figure 5:
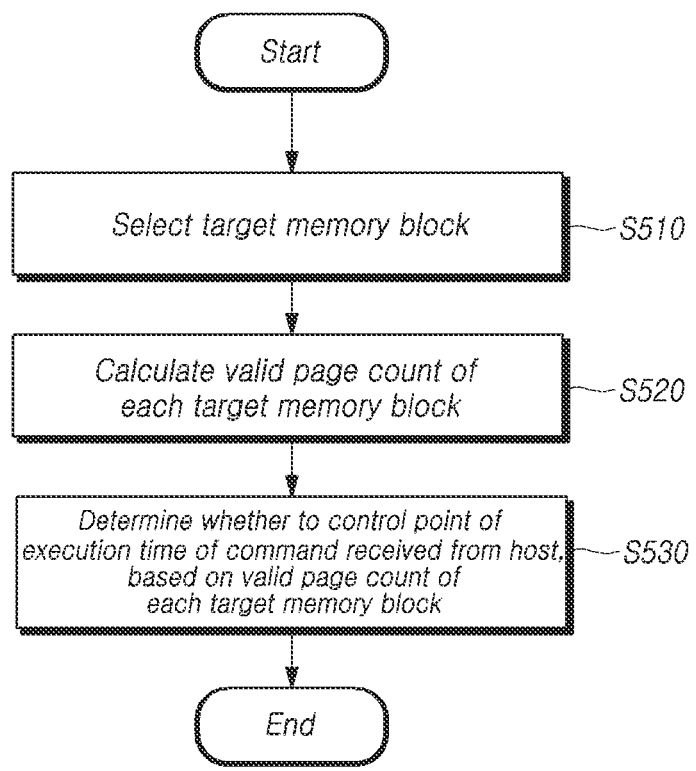
FIG. 5 is a flowchart to facilitate explanation of an operation of the memory system according to exemplary embodiments of the disclosure.

FIG. 5 is a flowchart to facilitate explanation of an operation of the memory system 100 according to exemplary embodiments of the disclosure.

Referring to FIG. 5, the memory controller 120 of the memory system 100 may select one or more target memory blocks TGT_BLK among the plurality of memory blocks BLK included in the memory device 110, according to the criterion described above with reference to FIG. 4 (S510).

The memory controller 120 may calculate a valid page count of each of the target memory blocks TGT_BLK (S520). An example of calculating a valid page count will be described below with reference to FIG. 6.

The memory controller 120 may determine whether to control a point of execution time of a command CMD received from the host, based on the valid page counts of the respective target memory blocks TGT_BLK (S530). An example of controlling a point of execution time of a command CMD will be described further below with reference to FIG. 7.

Figure 6:
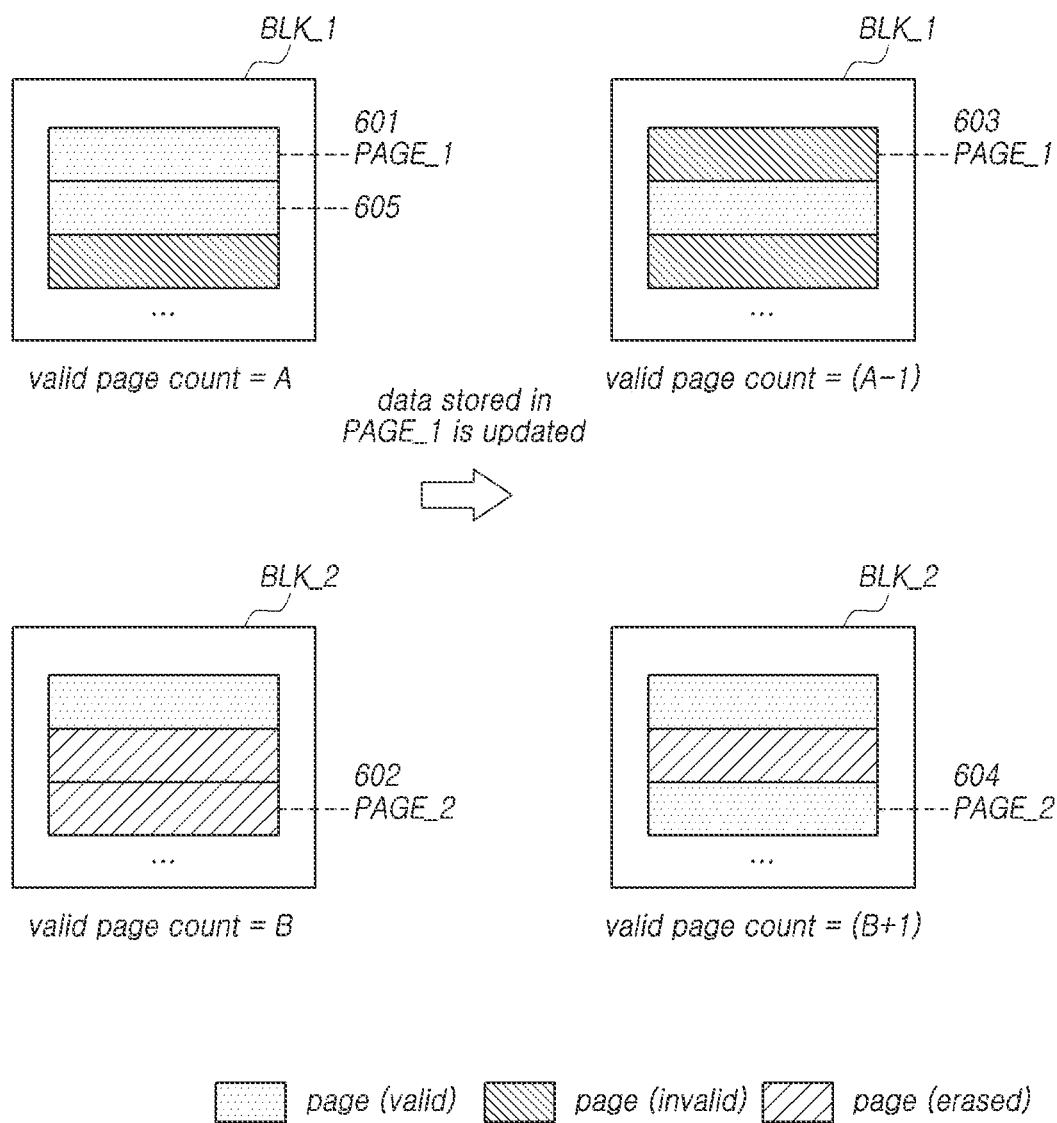
FIG. 6 is a diagram illustrating an exemplary embodiment of calculating a valid page count.

FIG. 6 is a diagram illustrating an exemplary embodiment of calculating a valid page count.

Referring to FIG. 6, it is assumed that, among the target memory blocks TGT_BLK included in the memory device 110, a valid page count of a first memory block BLK_1 is A and a valid page count of a second memory block BLK_2 is B. A and B are positive integers. A dotted block represents a valid page, a block with thick dashed-lines represents an invalid page, and a block with thin dashed-lines represents an erased page.

Further, it is assumed that data stored in a first page PAGE_1 601 which is a valid page among a plurality of pages included in the first memory block BLK_1 is updated. In this case, since the first page PAGE_1 601 in the memory block BLK_1 cannot be overwritten with updated data, the memory device 110 may store the updated data in a second page PAGE_2 602 of the second memory block BLK_2 (the second page PAGE_2 is a page in an erased state). The memory device 110 sets the first page PAGE_1 as an invalid page 603 (denoted by a block with thick dashed-lines), thereby preventing the data in the first PAGE_1 from being accessed before the data has been updated.

Since the first page PAGE_1 601, which was a valid page among the pages included in the first memory block BLK_1, has been changed to an invalid page 603, a valid page count of the first memory block BLK_1 becomes A−1.

In addition, since the second page PAGE_2 602, which was a page in an erased state among a plurality of pages included in the second memory block BLK_2, has been changed to a valid page 604, a valid page count of the second memory block BLK_2 becomes B+1.

It is to be understood that, in the case where the data stored in the first page PAGE_1 is not written to the second page PAGE_2 but to another page 605 of the first memory block BLK_1, a valid page count of the first memory block BLK_1 and a valid page count of the second memory block BLK_2 are not changed.

Figure 7:
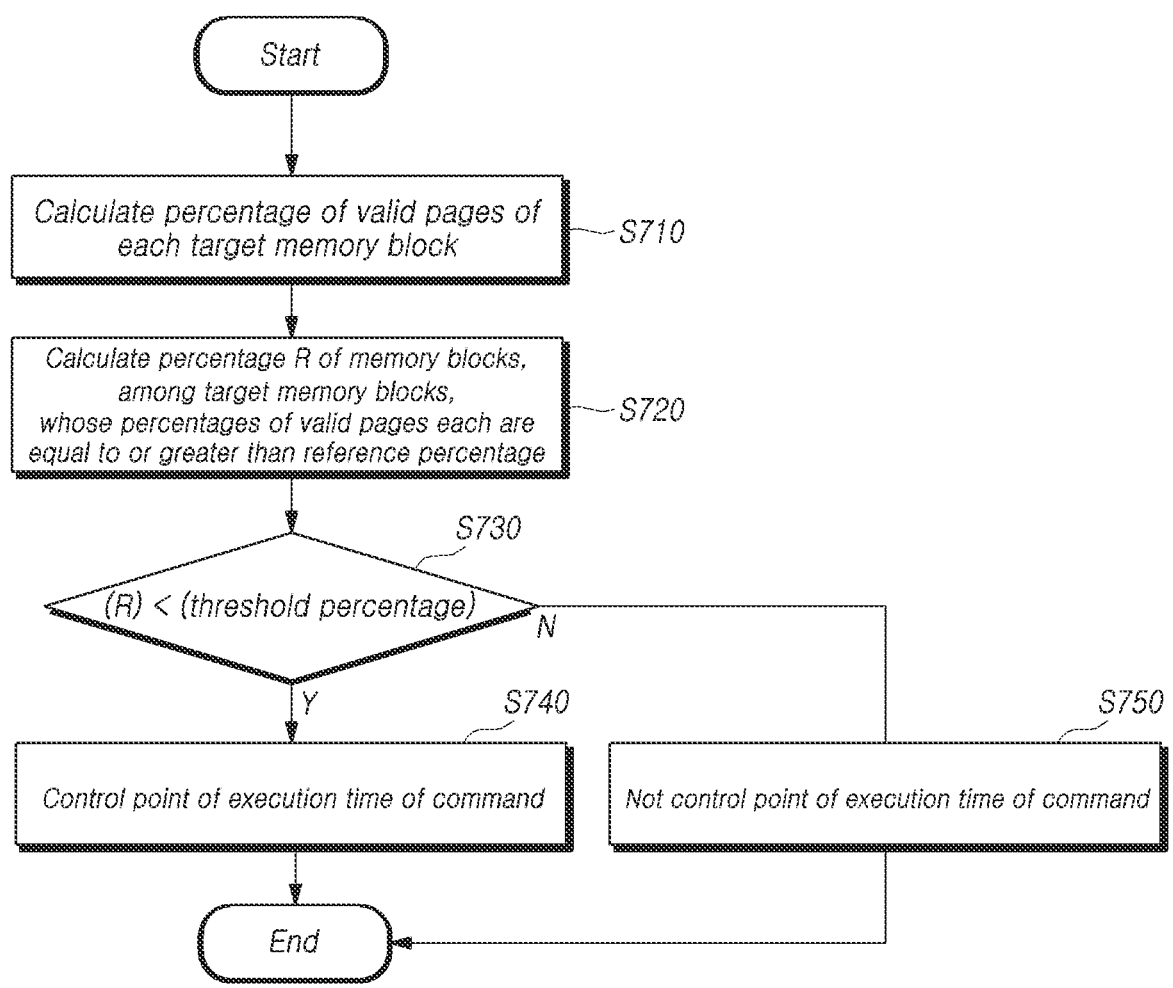
FIG. 7 is a flowchart to facilitate explanation of an exemplary operation in which the memory system determines whether to control a point of execution time of a command according to an embodiment of the disclosure.

FIG. 7 is a flowchart to facilitate explanation of an exemplary operation in which the memory system 100 determines whether to control a point of execution time of a command according to an embodiment of the disclosure.

Referring to FIG. 7, the memory controller 120 of the memory system 100 may calculate a percentage of valid pages of each target memory block TGT_BLK based on a valid page count of each target memory block TGT_BLK (S710).

A percentage of valid pages of each target memory block TGT_BLK may be, for example, a ratio between the number of valid pages of a target memory block and the number of total pages capable of storing user data of the same target memory block.

The memory controller 120 may calculate the value of R as a percentage value of memory blocks whose percentages of valid pages each are equal to or greater than a reference percentage (e.g., 90%), among the target memory blocks TGT_BLK (S720).

In one exemplary embodiment, assuming there are 10 target memory blocks TGT_BLK and six target memory blocks among them each has a percentage of valid pages equal to or greater than the reference percentage of 90%, R=(6/10)=60%. Accordingly, R is defined as a percentage value of the number of target memory blocks each having a percentage of valid pages equal to or greater than the reference percentage, among the total number of target memory blocks. That is, R represents a percentage value or a percentage value decimal equivalent, e.g., R=60 percent, 60/100, 6/10, or 0.6.

The memory controller 120 determines whether the value of R calculated at the step S720 is less than a predetermined threshold percentage (e.g., 10%) (S730).

When the value of R is less than the predetermined threshold percentage (Y at S730), the memory controller 120 may determine to control a point of execution time of a command CMD received from the host (S740) and terminate the operation (End).

On the other hand, when the value of R is equal to or greater than the threshold percentage (N at S730), the memory controller 120 may determine not to control a point of execution time of a command CMD received from the host (S750) and terminate the operation (End).

The fact that the value of R is less than the predetermined threshold percentage indicates that valid pages are not concentrated in specific target memory blocks, but they are rather distributed among the target memory blocks. Thus, in the case where the value of R is less than the predetermined threshold percentage, there is a high possibility that a garbage collection operation is to be performed so as to secure free memory blocks, and QoS for the host is highly likely to be influenced by the garbage collection operation.

Therefore, the memory controller 120 may control a point of execution time of a command CMD received from the host so as to reduce a deviation in latency of each command CMD that may occur due to the garbage collection operation.

On the other hand, the fact that the value of R is equal to or greater than the predetermined threshold percentage indicates that valid pages are concentrated in specific target memory blocks. Thus, in the case where the value of R is equal to or greater than the predetermined threshold percentage, there is a low possibility that a garbage collection operation is to be performed, and even when the garbage collection operation is performed, the garbage collection operation is highly likely to be terminated within a short time.

Therefore, the memory controller 120 does not need to control a point of execution time of a command CMD received from the host so as to reduce a deviation in latency of each command CMD that may occur due to the garbage collection operation.

An operation in which the memory controller 120 controls a point of execution time of a command CMD received from the host when the memory controller 120 determines to control the point of execution time of the command CMD received from the host will be described in detail herein below.

Figure 8:
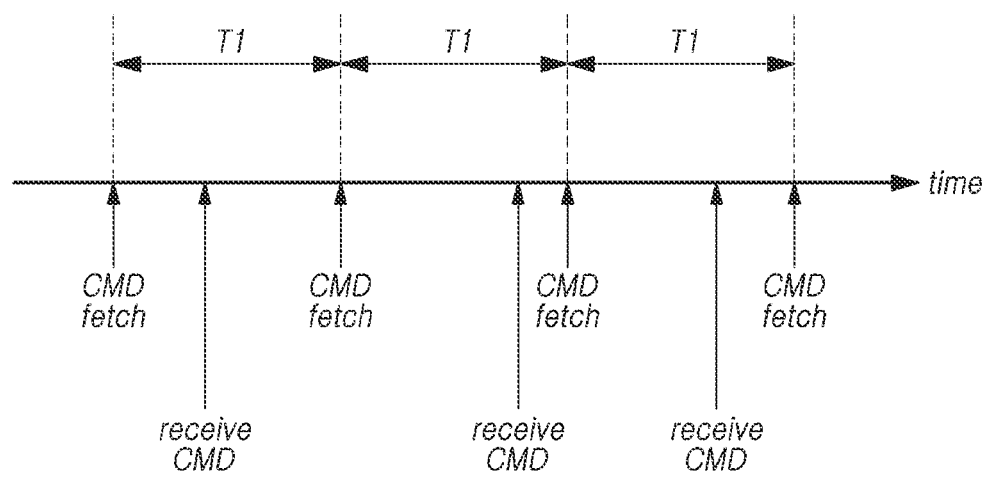
FIG. 8 is a diagram illustrating an exemplary operation in which the memory system fetches a command according to an embodiment of the disclosure.

FIG. 8 is a diagram illustrating an exemplary operation in which the memory system 100 fetches a command according to an embodiment of the disclosure.

Referring to FIG. 8, the memory controller 120 of the memory system 100 may process an operation of fetching a command CMD received from the host within a first predetermined time interval T1 so as to control a point of execution time of the command CMD. The terms first, second, etc. do not denote any order, but they are rather used to distinguish one element from another.

When receiving a command CMD from the host, the memory controller 120 may first temporarily store the received command CMD in an internal storage space (e.g., a command queue), fetch the stored command CMD, and then execute the fetched command CMD.

The memory controller 120 may process the operation of fetching the command CMD with the first time interval T1, regardless of a point of time at which the command CMD is received from the host, thereby controlling a point of execution time of a command CMD received from the host. The memory controller 120 fetches the stored commands at a regular time interval, e.g., at the end of the time interval T1 to control a point of execution time. Through this, the memory controller 120 may prevent a plurality of commands CMD from being fetched together within a short time.

Figure 9:
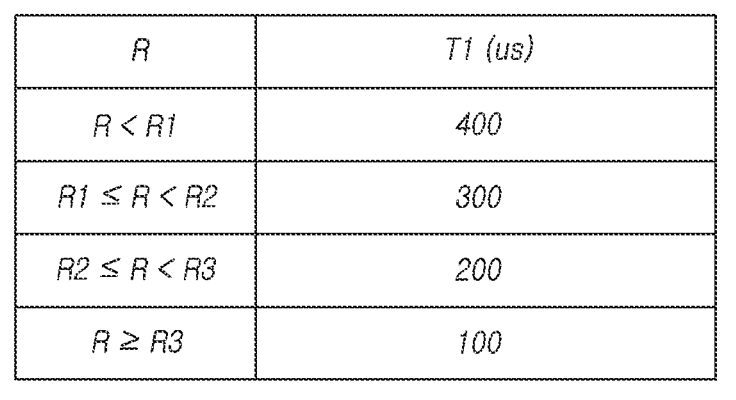

FIG. 9 is a diagram illustrating an exemplary operation of determining the first time interval T1 in FIG. 8.

Referring to FIG. 9, the memory controller 120 may determine the first time interval T1 based on the value of R as a percentage value of target memory blocks each having a percentage of valid pages equal to or greater than the reference percentage, among the total number of target memory blocks TGT_BLK. The memory controller 120 may set one or more percentage sections or ranges for R, and set the value of the first time interval T1 depending on which percentage section among the set percentage sections includes the value of R. As the value of R increases, there is a low possibility that a garbage collection operation is to be performed, and even when the garbage collection operation is performed, the garbage collection operation is highly likely to be terminated within a short time. Hence, as the value of R increases, the memory controller 120 may set the value of the first time interval T1 to a smaller value, thereby minimizing the degradation in throughput.

In one exemplary embodiment, the memory controller 120 may determine the first time interval T1 as 400 us when the value of R is less than R1, may determine the first time interval T1 as 300 us when the value of R is equal to or greater than R1 and less than R2, may determine the first time interval T1 as 200 us when the value of R is equal to or greater than R2 and less than R3, and may determine the first time interval T1 as 100 us when the value of R is equal to or greater than R3. In the example shown in FIG. 9, four percentage sections (or ranges) for R are used, but it is to be understood that the number is illustrative only and is chosen for describing the exemplary embodiment and should not be limiting.

Figure 10:
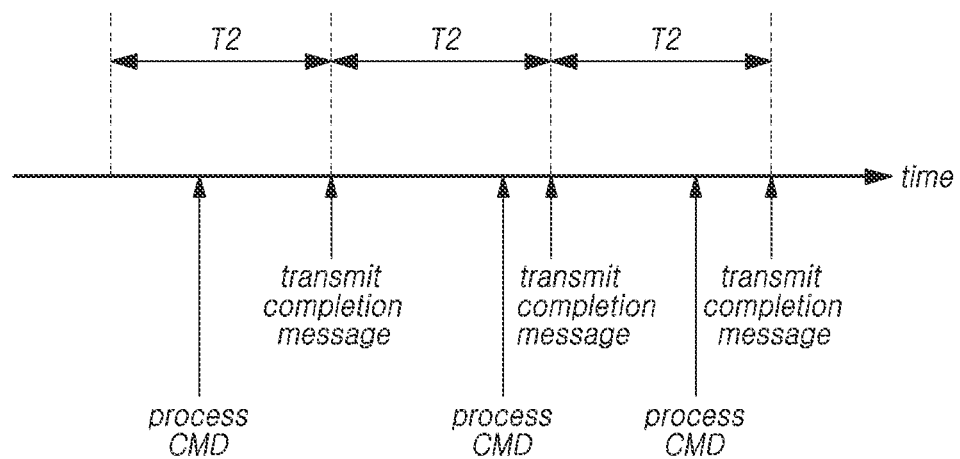
FIG. 10 is a diagram illustrating an exemplary operation in which the memory system transmits a processing completion message on a command to a host according to an embodiment of the disclosure.

FIG. 10 is a diagram illustrating an operation in which the memory system 100 transmits a processing completion message on a command to the host according to an embodiment of the disclosure.

Referring to FIG. 10, the memory controller 120 of the memory system 100 may process an operation of transmitting a processing completion message to the host on a command CMD that is received from the host within a second predetermined time interval T2 so as to control a point of execution time of the command CMD. It is to be understood that the terms first, second, etc. do not denote any order, but they are rather used to distinguish one element from another.

The memory controller 120 may transmit the processing completion message on the command CMD with the second time interval T2, regardless of a point of time at which the processing completion message on the command CMD can be transmitted to the host, thereby controlling a point of execution time of a command CMD received from the host. The memory controller 120 will transmit the processing completion message at the end of the second time interval T2 regardless of a point of time at which the processing completion message on the command CMD can be transmitted to the host.

Through this, a point of time at which the host transmits a new command to the memory system 100 may also be adjusted. This is because, in the case where a point of time at which the host receives a processing completion message on a previously transmitted command is delayed, the host may also delay a point of time at which the host transmits a new command to the memory system 100.

FIG. 11 is a diagram illustrating an exemplary operation of determining the second time interval T2 in FIG. 10.

Referring to FIG. 11, the memory controller 120 may determine the second time interval T2 based on the value of R as a percentage value of target memory blocks each having a percentage of valid pages equal to or greater than the reference percentage, among the total number of target memory blocks TGT_BLK. The memory controller 120 may set one or more percentage sections or ranges for R, and may set the value of the second time interval T2 depending on which percentage section among the set percentage sections includes the value of R. As the value of R increases, there is a low possibility that a garbage collection operation is to be performed, and even when the garbage collection operation is performed, the garbage collection operation is highly likely to be terminated within a short time. Hence, as the value of R increases, the memory controller 120 may set the value of the second time interval T2 to a smaller value, thereby minimizing the degradation in throughput.

In one exemplary embodiment, the memory controller 120 may determine the second time interval T2 as 400 us when the value of R is less than R1', may determine the second time interval T2 as 300 us when the value of R is equal to or greater than R1' and less than R2', may determine the second time interval T2 as 200 us when the value of R is equal to or greater than R2' and less than R3', and may determine the second time interval T2 as 100 us when the value of R is equal to or greater than R3'. In the example shown in FIG. 11, four percentage sections corresponding to the four time values 400 us, 300 us, 200 us, and 100 us of the second time interval T2 are used, but it is to be understood that the time values and the number of the percentage sections are illustrative and chosen for describing the exemplary embodiment and should not be limiting.

Figure 12:
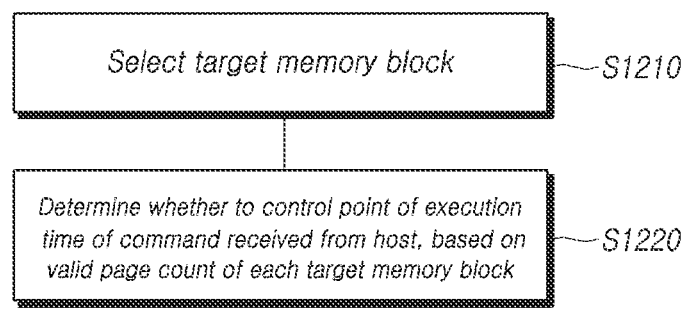
FIG. 12 is a flowchart illustrating a method for operating the memory system according to an embodiment of the disclosure.

FIG. 12 is a diagram to facilitate explanation of a method for operating the memory system 100 according to an embodiment of the disclosure.

Referring to FIG. 12, the method for operating the memory system 100 may include step S1210 of selecting one or more target memory blocks TGT_BLK among the plurality of memory blocks BLK included in the memory device 110. A target memory block TGT_BLK may store user data. User data may be accessed by the host which requests the memory system 100 to write data.

A target memory block TGT_BLK may be, for example, a memory block which is selected as a target for garbage collection (garbage collection target memory block) among the plurality of memory blocks BLK.

The method for operating the memory system 100 may include step S1220 of determining whether to control a point of execution time of a command CMD received from the host, based on valid page counts of the respective target memory blocks TGT_BLK.

Figure 13:
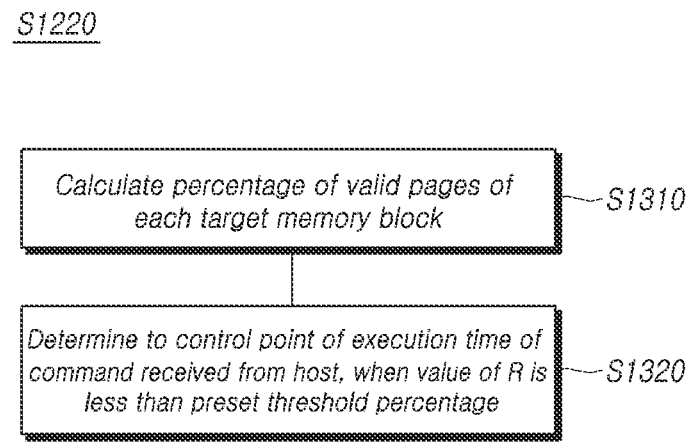
FIG. 13 is a flowchart illustrating a method of operating a memory system by determining whether to control a point of execution time of a command according to an embodiment of the disclosure.

FIG. 13 is a diagram to facilitate explanation of a method for operating the memory system 100 which includes determining whether to control a point of execution time of a command according to an embodiment of the disclosure.

Referring to FIG. 13, the step S1220 of determining whether to control a point of execution time of a command CMD received from the host may include step S1310 of calculating a percentage of valid pages of each target memory block TGT_BLK based on a valid page count of each target memory block TGT_BLK.

The step S1220 of determining whether to control a point of execution time of a command CMD received from the host may include step S1320 of determining to control a point of execution time of a command CMD received from the host, when the value of R as a percentage value of target memory blocks each having a percentage of valid pages equal to or greater than the reference percentage, among the plurality of target memory blocks TGT_BLK, is less than the preset threshold percentage. R is defined as a percentage value or percentage value decimal equivalent of a number of target memory blocks each having a percentage of valid pages equal to or greater than a reference percentage, among a total number of target memory blocks. A valid page is defined as a page that stores valid data accessible by a host.

The method for operating the memory system 100 may further include step of processing a fetch operation on a corresponding command CMD, with at least the first time interval T1, so as to control a point of execution time of a command CMD received from the host. The first time interval T1 may be determined based on the value of R described above.

The method for operating the memory system 100 may further include step of processing an operation of transmitting a processing completion message on a corresponding command CMD to the host, with at least the second time interval T2, so as to control a point of execution time of a command CMD received from the host. The second time interval T2 may be determined based on the value of R described above.

In some implementations, the operation of the memory controller 120 described above may be controlled by the control circuit 123, and may be performed in such a manner that the processor 124 executes (drives) firmware in which the overall operation of the memory controller 120 is programmed.

Figure 14:
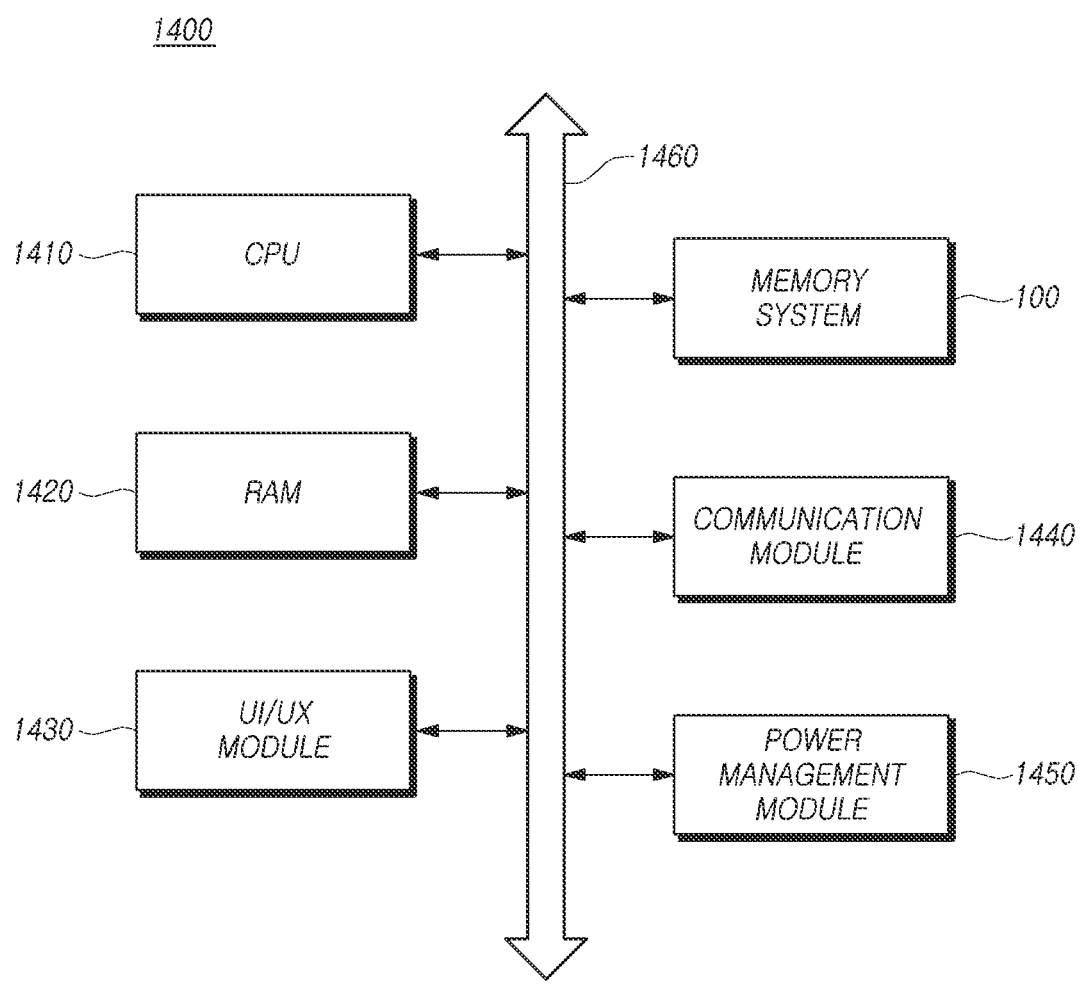
FIG. 14 is a diagram illustrating a configuration of a computing system according to some embodiments of the disclosed technology.

FIG. 14 is a diagram illustrating the configuration of a computing system 1400 based on an embodiment of the disclosed technology.

Referring to FIG. 14, the computing system 1400 according to an exemplary embodiment of the disclosed technology may include: a memory system 100 electrically connected to a system bus 1460; a CPU 1410 configured to control the overall operation of the computing system 1400; a RAM 1420 configured to store data and information associated with operations of the computing system 1400; a user interface/user experience (UI/UX) module 1430 configured to provide the user with a user environment; a communication module 1440 configured to communicate with an external device as a wired and/or wireless type; and a power management module 1450 configured to manage power used by the computing system 1400.

The computing system 1400 may be a personal computer (PC) or may be one or more of a mobile terminal, such as a smartphone, a tablet or various electronic devices.

The computing system 1400 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

According to embodiments of the disclosed technology described above, the operation delay time of the memory system may be advantageously reduced or minimized. In addition, according to an embodiment of the disclosed technology, overhead occurring in the process of calling a specific function may be advantageously reduced or minimized. In some embodiments, a memory controller may be configured to control a point of execution time of a command CMD so as to reduce a deviation in latency of each command CMD. In other embodiments, a memory controller may be configured to process an operation of transmitting a processing completion message to a host on a command CMD that is received from the host within a predetermined time interval so as to control a point of execution time of the command CMD. Although various embodiments of the disclosure have been described with particular specifics and varying details for illustrative purposes, those skilled in the art will appreciate that various modifications, additions and substitutions may be made without departing from the scope of the disclosure as defined in the following claims.

What is claimed is:

1. A memory system comprising:
    a memory device including a plurality of memory blocks; and
    a memory controller configured to communicate with the memory device and control the memory device,
    wherein the memory controller is configured to:
    select, among the plurality of memory blocks, one or more target memory blocks operable to store user data to be accessed by a host which requests the memory system to write data, and
    determine whether to control a point of execution time of a command received from the host, based on valid page counts of respective target memory blocks,
    wherein the memory controller is further configured to:
    calculate a percentage of valid pages of each target memory block, based on a valid page count of each target memory block, and
    determine to control the point of execution time of the command received from the host, when a value of R is less than a preset threshold percentage, R being a percentage value of target memory blocks each having a percentage of valid pages equal to or greater than a reference percentage, among a total number of target memory blocks.

2. The memory system according to claim 1, wherein a target memory block is a memory block which is selected for garbage collection.

3. The memory system according to claim 1, wherein the memory controller is further configured to process a fetch operation on the command, within a first time interval, so as to control the point of execution time of the command received from the host.

4. The memory system according to claim 3, wherein the memory controller is further configured to determine the first time interval based on the value of R.

5. The memory system according to claim 1, wherein the memory controller processes an operation of transmitting a processing completion message on the command to the host, with at least a second time interval, so as to control the point of execution time of the command received from the host.

6. The memory system according to claim 5, wherein the memory controller is further configured to determine the second time interval based on the value of R.

7. A method for operating a memory system including a memory device including a plurality of memory blocks, the method comprising:
    selecting, among the plurality of memory blocks, one or more target memory blocks operable to store user data to be accessed by a host which requests the memory system to write data; and
    determining whether to control a point of execution time of a command received from the host, based on valid page counts of respective target memory blocks,
    wherein determining of whether to control the point of execution time of the command received from the host comprises:
    calculating a percentage of valid pages of each target memory block, based on a valid page count of each target memory block; and
    determining to control the point of execution time of the command received from the host, when a value of R is less than a preset threshold percentage, R being a percentage value of target memory blocks each having a percentage of valid pages equal to or greater than a reference percentage, among a total number of target memory blocks.

8. The method according to claim 7, wherein the target memory block is a memory block which is selected for garbage collection.

9. The method according to claim 7, further comprising:
    processing a fetch operation on the command, within a first time interval, so as to control the point of execution time of the command received from the host.

10. The method according to claim 9, wherein the first time interval is determined based on the value of R.

11. The method according to claim 7, further comprising:
    processing an operation of transmitting a processing completion message on the command to the host, within a second time interval, so as to control the point of execution time of the command received from the host.

12. The method according to claim 11, wherein the second time interval is determined based on the value of R.

* * * * *